March 25, 1930.                    C. S. GLENNY                    1,751,627
                          FRUIT JUICE EXTRACTOR AND STRAINER
                                Filed March 12, 1928
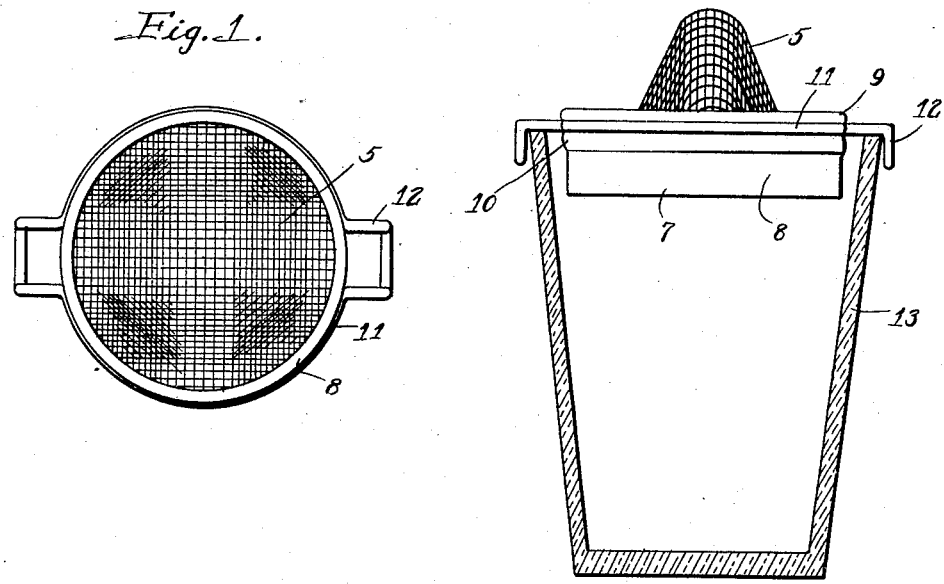
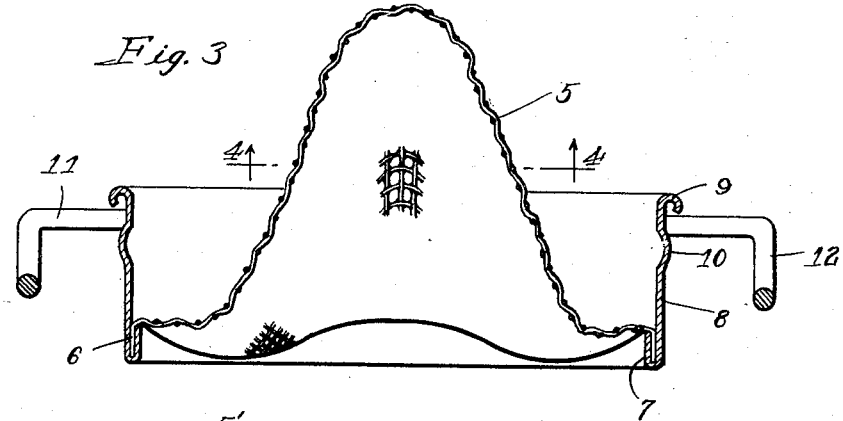
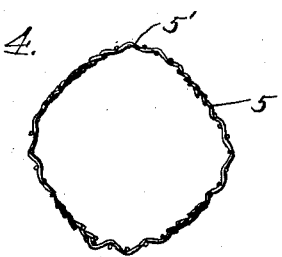
Inventor:
Clarence S. Glenny
By
Wilson & McCanna
Attys.

Patented Mar. 25, 1930

1,751,627

UNITED STATES PATENT OFFICE

CLARENCE S. GLENNY, OF ROCKFORD, ILLINOIS, ASSIGNOR TO THE WASHBURN COMPANY, OF WORCESTER, MASSACHUSETTS, A CORPORATION OF MASSACHUSETTS

FRUIT-JUICE EXTRACTOR AND STRAINER

Application filed March 12, 1928. Serial No. 261,088.

This invention relates to a novel form of fruit juice extractor and strainer.

The principal object of my invention is to provide a device of the kind referred to which, as distinguished from similar devices molded of glass, is entirely of metal and screen construction and is, therefore, practically unbreakable and which affords not only the reaming action of the molded glass articles but also a strainer action by virtue of the screen construction of the reamer-shaped body thereof. The screen construction is also of advantage in that it insures better juice extraction by the more efficient breaking of the juice sacs in the meshes thereof.

A special feature of my invention, making it practical to utilize ordinary wire screen to form the reamer-shaped body, lies in dipping the same in molten tin after the screen has been formed to the desired shape, the solidified tin serving to tie together all of the cross wires such that the body is made strong enough to withstand the pressure incident to the "squeezing" of oranges or lemons for the extraction of the juices therefrom.

The invention is illustrated in the accompanying drawing in which—

Figure 1 is a top view of a device made in accordance with my invention;

Fig. 2 is a side view thereof showing the same placed directly on a glass into which it is desired to have the juice from the orange or lemon squeezed;

Fig. 3 is a central vertical section through the device on an enlarged scale; and Fig. 4 is a sectional detail through the reamer-shaped body taken on the line 4—4 of Fig. 3.

The same reference numerals are applied to corresponding parts throughout the views.

The device comprises a body 5 made of ordinary wire screen formed to the rounded top, pyramid or nearly conical shape by hand or between dies before the marginal edges 6 are clinched, as indicated at 7, in the lower edge of a ring frame 8 formed of sheet metal. The latter has the upper edge rolled, as shown at 9, so as to present a neatly rounded rim, and below the rim is formed an annular bead 10 for retaining a ring-shaped wire supporting and reenforcing frame 11. The latter is preferably formed with diametrically opposed hook-shaped outwardly reaching arms 12 arranged to rest on the rim of a glass, such as that represented at 13, or on a cup or other suitable receptacle into which it is desired to have the juice from the orange or lemon squeezed. The article, after being built up to the form described and cleaned in the usual way, is then arranged to be dipped in molten tin and struck a sharp blow to remove the excess tin from the meshes of the screen before the tin has a chance to cool and solidify. It is found that the solidified tin ties together all of the crossed wires so firmly that the reamer-shaped body is rendered exceedingly strong and will easily withstand the pressure incident to the squeezing of oranges or lemons for the extraction of the juices therefrom. Thus, the tinning serves not only as a protective plating but also reenforces the screen to such an extent that braces or other special means to lend strength to the body are not required.

In the use of the article it will be evident from the foregoing description that the same may be placed directly on the glass or cup into which it is desired to have the juice squeezed. The pyramid form of the body 5, which results in rounded corners at the sides of the body, as best appears at 5' in Fig. 4, affords the same reaming action that is gotten with the ordinary molded glass article provided for a similar purpose. However, in the present case the screen serves to strain out the seeds or bits of skin or core which prove bothersome in the use of the ordinary squeezer where there is no means for separating offal pulp. Furthermore, the screen has a tendency to cut or break the juice sacs much more efficiently than the ribs provided on the ordinary squeezer, such that the maximum amount of juice is bound to be extracted and there is little or no waste.

The device is obviously very cheap to manufacture, is practically indestructible, and is just as easy to wash as an ordinary sieve.

It is believed the foregoing description conveys a clear understanding of my invention and of its various objects and advantages. The appended claims have been drawn with a view to covering all legitimate modifications and adaptations which might occur to one skilled in the art as a result of the present disclosure.

I claim:

1. A combination fruit juice extractor and strainer comprising, a frame, a pyramidal-shaped screen reaming body adapted to extract and strain the juice mounted therein, having a plurality of ribs the outermost points of which lie on the surface of a cone, and intermediate portions connecting said ribs lying within the cone formed thereby, said ribs being arranged to cut the juice sacs of fruits to be reamed, and said intermediate portions being adapted to act as depositors for the pulp of the fruit loosened during the reaming action.

2. A combination fruit juice extractor and strainer comprising a ring frame, a quadrilateral pyramidal-shaped body of wire screen disposed within said frame and having the marginal edges thereof secured to the latter, said screen body having means for reenforcing the same to withstand pressure on top thereof incident to squeezing fruit thereon, and means for supporting said frame on a suitable receptacle.

3. A utensil of the character described, comprising a substantially quadrilateral pyramidal-shaped body of foraminate material arranged to serve in a reaming or squeezing action to cut juice sacs in fruit for the extraction of juice therefrom, the said material serving at the same time to strain the juice to separate the pulp therefrom.

In witness of the foregoing I affix my signature.

CLARENCE S. GLENNY.